United States Patent
Walley et al.

(10) Patent No.: US 8,583,169 B2
(45) Date of Patent: Nov. 12, 2013

(54) METHOD AND SYSTEM FOR BLUETOOTH TRANSPORT SHARING TO CARRY GPS OR OTHER TYPES OF DATA

(75) Inventors: John Walley, Ladera Ranch, CA (US); Charlie Abraham, Los Gatos, CA (US)

(73) Assignee: Broadcom Corporation, Irvine, CA (US)

( * ) Notice: Subject to any disclaimer, the term of this patent is extended or adjusted under 35 U.S.C. 154(b) by 965 days.

(21) Appl. No.: 12/039,032

(22) Filed: Feb. 28, 2008

(65) Prior Publication Data

US 2009/0221320 A1    Sep. 3, 2009

(51) Int. Cl.
*H04M 1/00* (2006.01)

(52) U.S. Cl.
USPC .................................. 455/552.1; 455/41.2

(58) Field of Classification Search
USPC .............. 455/552.1, 41.1, 41.2, 553.1, 76; 370/328, 338; 342/352, 458
See application file for complete search history.

(56) References Cited

U.S. PATENT DOCUMENTS

| | | | |
|---|---|---|---|
| 7,352,732 B2 * | 4/2008 | Sata et al. | 370/338 |
| 2003/0025635 A1 * | 2/2003 | Hilgers et al. | 343/700 MS |
| 2005/0059345 A1 * | 3/2005 | Palin et al. | 455/41.2 |
| 2006/0270449 A1 * | 11/2006 | Kim et al. | 455/552.1 |
| 2007/0298834 A1 * | 12/2007 | Rofougaran | 455/552.1 |
| 2008/0049713 A1 * | 2/2008 | Yam | 370/349 |
| 2008/0175379 A1 * | 7/2008 | Hansen et al. | 380/44 |
| 2008/0246651 A1 * | 10/2008 | Schmidt et al. | 342/352 |
| 2008/0279137 A1 * | 11/2008 | Pernu et al. | 370/328 |

* cited by examiner

*Primary Examiner* — Edward Urban
*Assistant Examiner* — Golam Sorowar
(74) *Attorney, Agent, or Firm* — Thomas|Horstemeyer, LLP

(57) ABSTRACT

Aspects of a method and system for Bluetooth transport sharing to carry GPS or other types of data are provided. A multi-standard Bluetooth enabled device may operate via integrated radios such as a GPS radio. The Bluetooth transport path may be shared to carry both Bluetooth data and non-Bluetooth data. The non-Bluetooth data may be converted to Bluetooth vendor specific packets using the assigned vendor specific commands. The Bluetooth vendor specific packets may be multiplexed with other Bluetooth HCI packets and communicate over the Bluetooth transport path. The Bluetooth vendor specific packets may be de-multiplexed based on the assigned vendor specific command and routed properly. Non-Bluetooth devices may be an on-chip and off-chip devices. The multi-standard Bluetooth enabled device may enable a downloadable driver to ensure communication with the off-chip devices. The Bluetooth transport path may be UART, USB, SPI, and/or I²C.

33 Claims, 5 Drawing Sheets

METHOD AND SYSTEM FOR BLUETOOTH TRANSPORT SHARING TO CARRY GPS OR OTHER TYPES OF DATA

CROSS-REFERENCE TO RELATED APPLICATIONS/INCORPORATION BY REFERENCE

Not Applicable.

FIELD OF THE INVENTION

Certain embodiments of the invention relate to communication. More specifically, certain embodiments of the invention relate to a method and system for Bluetooth transport sharing to carry GPS or other types of data.

BACKGROUND OF THE INVENTION

In recent years, there has been a phenomenal growth in mobile or handheld computing and communication devices such as, for example, personal digital assistants (PDAs), mobile phones, smart phones and personal media players. As these devices increasingly become indispensable, multiple usages via wireless start to gravitate toward these devices. For example, if a person wants to use a device to make phone calls, download songs, listen through headsets, check location, listen to talk shows and watch sportscasts, then multiple technologies such as wireless WAN (cellular or WiMAX), high-speed wireless LAN (WiFi), short-range wireless (Bluetooth), GPS, FM and mobile TV, may need to be integrated to that device. In certain circumstances, some of these technologies may operate at the same time. Device vendors are then faced with the task of balancing the need for more features in products to improve user experiences, with the conflicting forces of lower cost, less space and longer battery life to sustain margins in a market.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method is provided for Bluetooth transport sharing to carry GPS or other types of data, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for Bluetooth transport sharing to carry GPS or other types of data. Various aspects of the invention may utilize a vendor specific command to convert non-Bluetooth data to Bluetooth vendor specific packets to enable Bluetooth transport path sharing. The Bluetooth vendor specific command packets may be multiplexed with other Bluetooth packets and communicated over the Bluetooth transport path. The Bluetooth vendor specific command packets may be de-multiplexed from other Bluetooth packets based on the assigned vendor specific commands. The non-Bluetooth data may comprise FM data or FM RDS data, Near Field Communication (NFC) data, wireless magnetic sensor data, IrDA data, accelerometer data, and/or cellular data. The non-Bluetooth data may be associated with both on-chip and/or off-chip non-Bluetooth devices. An on-chip non-Bluetooth device may be integrated to the Bluetooth enabled device host controller, while an off-chip non-Bluetooth device may stand alone from the Bluetooth enabled device host controller. In this regard, the Bluetooth enabled device may enable a downloadable driver to provide instructions for conveying the non-Bluetooth data to the off-chip non-Bluetooth device correctly. The Bluetooth transport path may be UART, USB, SPI, and/or I²C. The Bluetooth enabled device may power up and down the Bluetooth transport path based upon the needs of Bluetooth device and/or non-Bluetooth devices.

Figure 1:
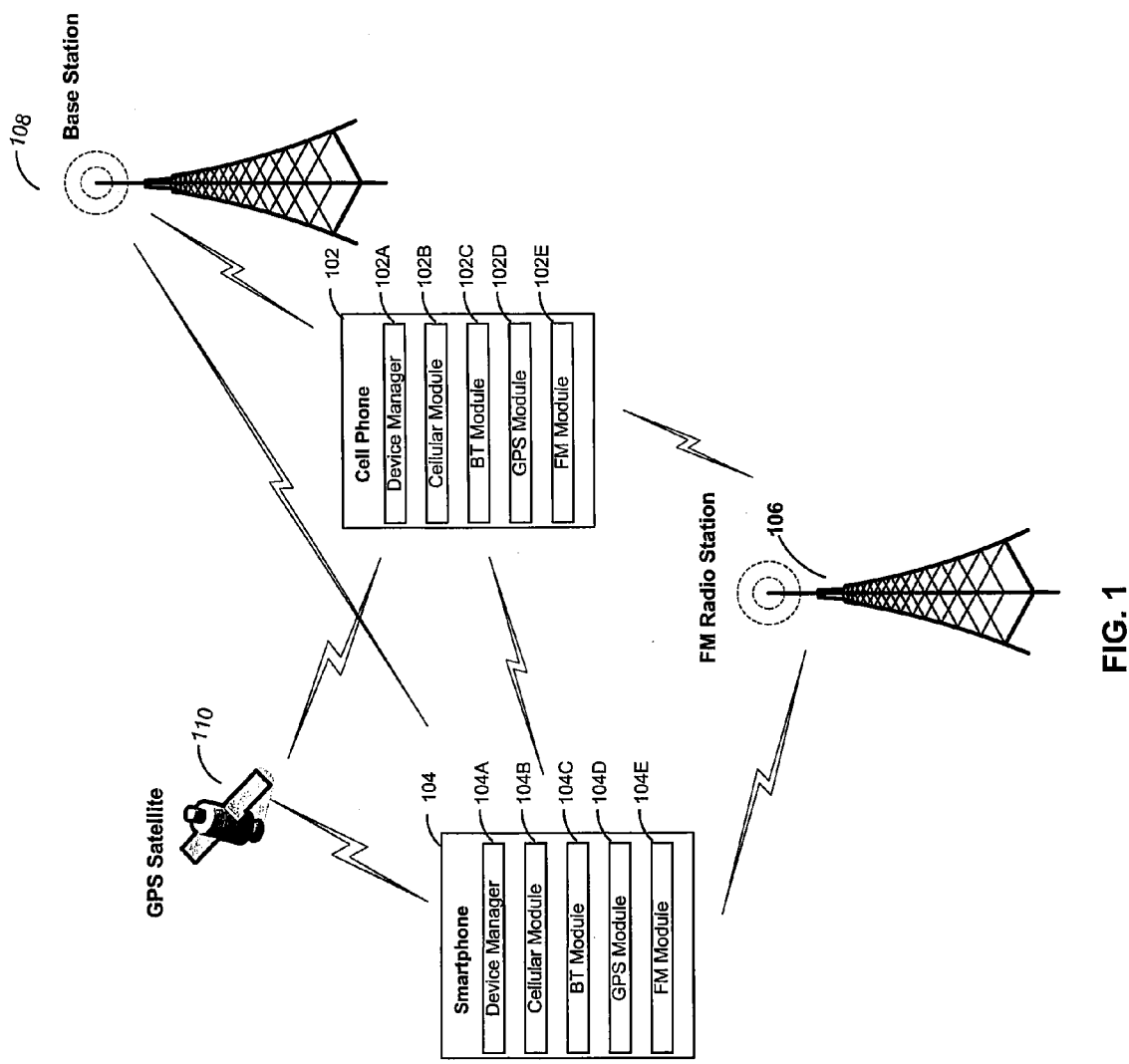
FIG. 1 is a diagram of an exemplary system with multi-standard devices for sharing Bluetooth transport to carry GPS or other type of data, in accordance with an embodiment of the invention.

FIG. 1 is a diagram of an exemplary system with multi-standard devices for sharing Bluetooth transport to carry GPS or other type of data, in accordance with an embodiment of the invention. Referring to FIG. 1, there is shown a cell phone 102, a Smartphone 104, a FM radio station 106, a base station 108, and a GPS satellite 110. The cell phone 102 may comprise a device manager 102A, a cellular module 102B, a BT module 102C, a GPS module 102D, and a FM module 102E. The Smartphone 104 may comprise a device manager 104A, a cellular module 104B, a BT module 104C, a GPS module 104D, and a FM module 104E.

The device manager 102A may comprise suitable logic, circuitry and/or code that may provide various device management functions to enable communication through integrated modules on the cell phone 102. The cellular module 102B may support a plurality of cellular wireless technologies such as CDMA and/or variants thereof, GSM. The BT module 102C may comprise suitable logic, circuitry and/or code that may enable Bluetooth communication. The GPS module 102D may comprise suitable logic, circuitry and/or code that may receive and process GPS data. The FM module 102E may comprise suitable logic, circuitry and/or code that may receive and process FM or FM RDS data.

The cell phone 102 may comprise suitable logic, circuitry and/or code that may enable communication via a plurality of wireless technologies such as CDMA and/or variants thereof, GSM, UMTS and/or variants thereof, Bluetooth, GPS, and/or FM. In this regard, the cellular module 102B may comprise a CDMA transmitter and/or receiver module, a GSM transmitter and/or receiver module, an UMTS transmitter and/or receiver module, a GPS receiver module, and a FM receiver module to enable communication via these various technologies or standards. The cell phone 102 may be enabled to communicate cellular data, Bluetooth data, FM data, and GPS data. The cell phone 102 may be enabled to function using different technologies at the same time whenever applicable. For example, the cell phone 102 may be in an active call through a cellular network such as GSM, while receiving GPS data through a GPS radio. In this regard, various types of data received by the cell phone 102 may be passed to the cell phone host by sharing a common Bluetooth transport interface such as, for example, UART, SPI, SDIO and/or USB. A vendor specific command may be assigned to each specific data type. For example, an assigned vendor specific command may be selected and utilized for GPS data, while another vendor specific command may be picked for FM data. Non-Bluetooth types of data may be packed around Bluetooth packets by using assigned vendor specific command such that the Bluetooth transport may recognize the corresponding packets and tunnel the non-Bluetooth data over the common Bluetooth transport to corresponding non-Bluetooth device or corresponding non-Bluetooth upper stack.

The cell phone 102 may be enabled to support other communication technologies by intergrading, for example, WLAN, WiMAX, and/or DVB-H technology. In this regard, the cell phone 102 may share a common Bluetooth transport to carry WLAN data, WiMAX data, and/or DVB-H data between the cell phone host and the corresponding WLAN device, WiMAX device, and/or DVB-H device The device manager 104A may comprise suitable logic, circuitry and/or code that may provide various device management functions to enable communication through integrated modules on the Smartphone 104. The cellular module 104B may support a plurality of cellular wireless technologies such as GSM and CDMA, and/or variants thereof. The BT module 104C may comprise suitable logic, circuitry and/or code that may enable Bluetooth communication. The GPS module 104D may comprise suitable logic, circuitry and/or code that may receive and process GPS data. The FM module 104E may comprise suitable logic, circuitry and/or code that may receive and process FM or FM RDS data.

The Smartphone 104 may comprise suitable logic, circuitry and/or code that may enable communication via a plurality of wireless technologies such as CDMA and/or variants thereof, GSM, UMTS and/or variants thereof, Bluetooth, GPS, and/or FM. Similar to the cell phone 102, the Smartphone 104 may share common Bluetooth transport for various types of data such as GPS data, FM data, and cellular data. The Smartphone 104 may be enabled to support other communication technologies by intergrading, for example, WLAN, WiMAX, and/or DVB-H technology. In this regard, the Smartphone 104 may share a common Bluetooth transport to carry WLAN data, WiMAX data, and/or DVB-H data between the Smartphone host and the corresponding WLAN device, WiMAX device, and/or DVB-H device.

The FM radio station 106 may comprise suitable logic, circuitry and/or code that may be allocated a single carrier frequency to broadcast a small subcarrier signal centered at the single carrier frequency. The FM radio station 106 may enable transmission of FM data or FM RDS data to multi-standard devices such as the cell phone 102. A user of the cell phone 102 may receive, for example, real time financial information, news, sports, text alerts, album name, audio alerts and/or music over FM subcarrier frequencies by the FM radio station 106. The FM radio station 106 may carry one-way radio to devices such as the cell phone 102. The FM radio station 106 may broadcast radio data service (RDS) which allows text or other information such as the current FM radio station name, album name, artist name, composer, genre, and song name, to piggyback on the standard FM radio signals. When a local FM radio such as one within the cell phone 102 is equipped with a RDS tuner, the current FM radio station name and the album name, for example, may be displayed by the cell phone 102.

The base station 108 may comprise suitable logic, circuitry and/or code that may enable communication with the cellular phone 102 via, for example, GSM, EDGE, GPRS, HSDPA, UMTS, and/or WCDMA technology. The base station 108 may be enabled to transmit and receive calls from the cell phone 102 over cellular network such as GSM or GPRS.

The GPS satellite 110 may comprise suitable logic, circuitry and/or code that may transmit spread spectrum signals received at a GPS enabled device such as the cell phone 102 and/or the Smartphone 104. The GPS signal may be used to support various location related services, for example, E911 and geo-location services. Although a single GPS satellite 110 is shown, there may, however, be a plurality of GPS satellites 110 which are transmitting signals received by GPS enabled devices such as the cell phone 102 and/or the Smartphone 104.

In operation, a multi-standard device such as the cell phone 102 may maintain normal communication with the base station 108 through the cellular module 102B over a cellular network such as GSM. Also due to user intervention or other application logic, the cell phone 102 may be enabled to receive signals from the FM radio station 106 and/or the GPS satellite 110 by turning on the FM module 102E and the GPS module 102D. The cell phone 102 may also be enabled to simultaneous communicate with the Smartphone 104 over Bluetooth. There may be instances where the user of the cell phone 102 may want to listen to news through the integrated FM radio. The user may generate FM station selection data via, for example, the cell phone user interface. The cell phone 102 may be tuned to an RF frequency based on the FM station selection data and may receive a FM signal over the RF frequency from the FM radio station 106.

In instances where the cell phone user may need to determine relative location and/or direction of the user to other landmarks, the user may turn on the GPS radio of the cell phone 102 to receive GPS data from the GPS satellite 110. The received GPS data may be used to determine location and/or direction via GPS mapping technologies. For each non-Bluetooth data, a vendor specific command may be assigned. The Bluetooth transport interface, for example, UART and/or SPI, may be shared by using the vendor specific commands to communicate data for a plurality of technologies between the host of the cell phone 102 and integrated modules such as the FM module, the GPS module, the cell phone module, and the Bluetooth module.

Figure 2:
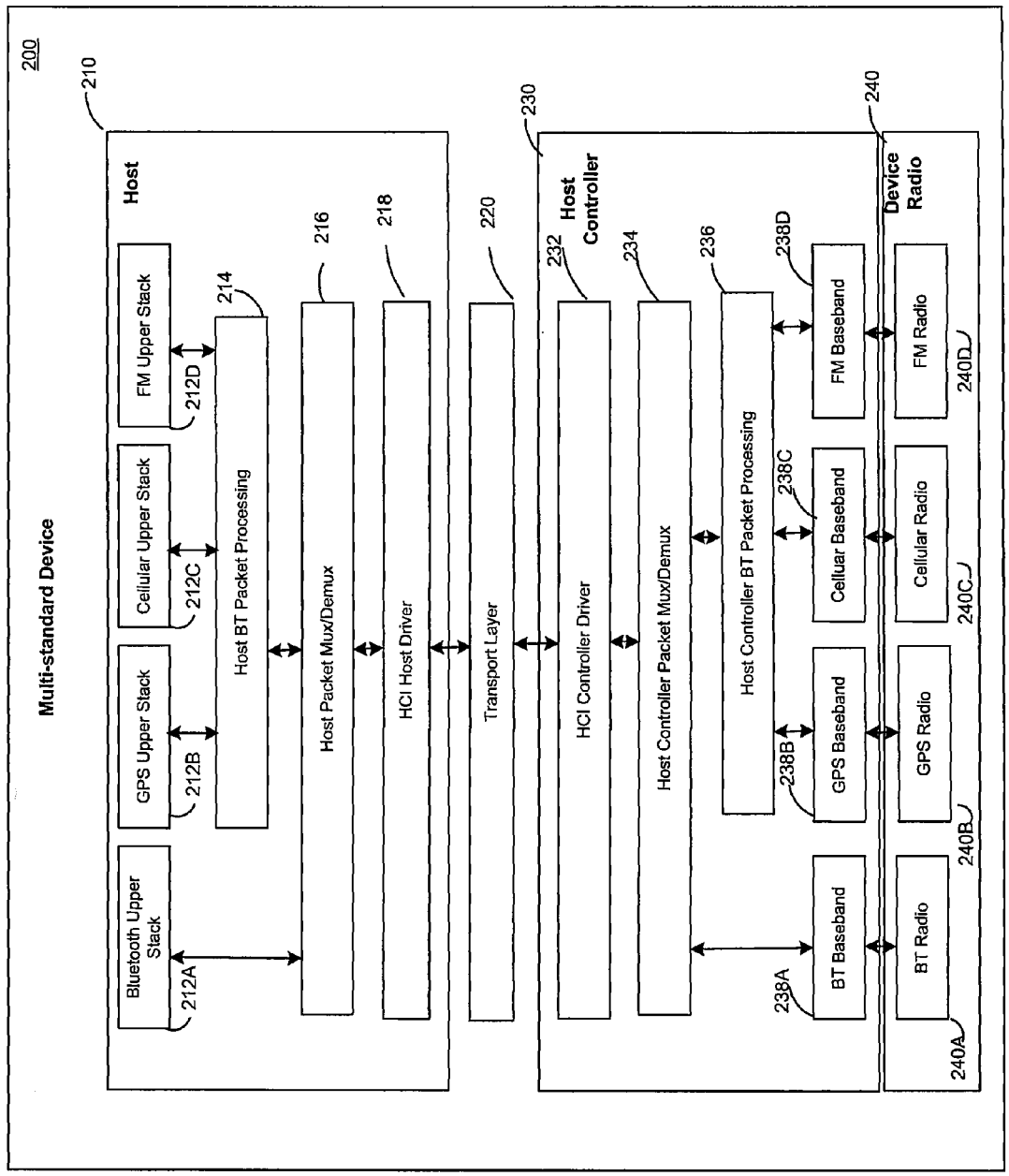
FIG. 2 is an exemplary architecture of a multi-standard device for sharing Bluetooth transport to carry GPS or other type of data, in accordance with an embodiment of the invention.

FIG. 2 is an exemplary architecture of a multi-standard device for sharing Bluetooth transport to carry GPS or other type of data, in accordance with an embodiment of the invention. Referring to FIG. 2, there is illustrated that the exemplary multi-standard device may comprise a host 210, a transport layer 220, a host controller 230, and a device radio 240. The host 210 may compromise an upper stack 212, a host BT packet processing 214, a host packet mux/demux 216, and a HCI host driver 218. The upper stack 212 may comprise a Bluetooth upper stack 212A, a GPS upper stack 212B, a cellular upper stack 212C, and a FM upper stack 212D. The host controller 230 may comprise a HCI controller driver 232, a host controller packet mux/demux 234, a host controller BT packet processing 236, and a baseband 238. The baseband 238 may comprise a BT baseband 238A, a GPS baseband 238B, a cellular baseband 238C, and a FM baseband 238D. The device radio 240 may comprise a BT radio 240A, a GPS radio 240B, a cellular radio 240C, and a FM radio 240D.

The upper stack 212 may comprise suitable logic, circuitry and/or code that may be enabled to implement higher level protocols and transfer the technology specific application information from the host 210 to the host controller 230. The application information on the host 210 may be the highest-level component of a specific technology solution such as the Bluetooth upper stack 212A for Bluetooth application, the GPS upper stack 212B for GPS application, the cellular upper stack 212C for cellular application, and the FM upper stack 212D for FM radio application.

The host BT packet processing 214 may comprise suitable logic, circuitry and/or code that may convert non-Bluetooth data such as GPS data, FM data, and/or cellular data, to a Bluetooth HCI packet format, and vice versa, by using vendor specific commands (VSC) at the host 210. In this regard, a VSC may be assigned to each non-Bluetooth data type. The non-Bluetooth data may be segmented or assembled to be encapsulated or de-encapsulated into/from a non-Bluetooth VSC packet. The size of the non-Bluetooth VSC packet may be determined based on the Bluetooth transport capability and/or quality of service (QoS). The non-Bluetooth VSC packet may be proprietary and may pass Bluetooth transport path independent of Bluetooth stack.

The host packet mux/demux 216 may comprise suitable logic, circuitry and/or code that may multiplex or de-multiplex a plurality of different kinds of traffic over a common Bluetooth transport layer such as UART and/or SPI. In this regard, the assigned VSC may be utilized for traffic routing between the host 210 and the host controller 230. In this regard, non-Bluetooth VSC packets may be allowed to pass over the Bluetooth transport layer independent of Bluetooth protocols.

The HCI host driver 218 may comprise suitable logic, and/or code that may provide a Bluetooth standardized interface between the host 210 and the host controller 230. The HCI host driver 218 may be used to parse received event packet from the host controller 230 to determine which event occurred or to pass command packet from the host 210 to the host controller 230 for further process.

The transport layer 220 may comprise suitable logic, and/or code that may be enabled to provide transparent exchange of Bluetooth HCI-specific information. The transport layer 220 may enable intermediate layers to transfer data between the host 210 and the host controller 230 without intimate knowledge of the data being transferred. The transport layer 220 may be powered up and down when such data transfer may occur. The transport layer 220 may be USB, UART, SPI, RS232, and/or I²C.

The HCI controller driver 232 may comprise suitable logic circuitry and/or code that may enable Bluetooth communication for the Bluetooth hardware by accessing Bluetooth baseband commands, link manager commands, hardware status registers, control registers, and event registers.

The host controller packet mux/demux 234 may comprise suitable logic, circuitry and/or code that may multiplex or de-multiplex traffic for a plurality of different technologies so as to enable sharing of the common Bluetooth transport layer 220 by using VSCs. In this regard, VSCs may enable non-Bluetooth data to be communicated over the Bluetooth transport layer 220 independent of the Bluetooth protocols.

The host controller BT packet processing 236 may comprise suitable logic, circuitry and/or code that may be enabled to convert non-Bluetooth data such as GPS data, FM data, and/or cellular data, to a Bluetooth HCI packet format, and vice versa, by using vendor specific commands (VSC) at the host controller 230. The non-Bluetooth data communicated from and/or to a non-Bluetooth device may be encapsulated or de-encapsulated into and/or from corresponding VSC packets. The size of the non-Bluetooth VSC packets may be determined based on the Bluetooth transport capability and/or QoS. The non-Bluetooth VSC packets may be proprietary and may be communicated over the Bluetooth transport path independent of the Bluetooth stack.

The Bluetooth baseband 238A may comprise suitable logic, circuitry and/or code that may be enabled to carry out Bluetooth baseband protocols and low-layer link routines. The Bluetooth protocols defined within the scope of the baseband specification include (among others) physical channels and links, data packet definitions, error correction and detection, logical channels, channel control, and hop selection. The GPS baseband 238B may comprise suitable logic, circuitry and/or code that may be enabled to handle GPS specific baseband processing such as spectrum de-spreading, BPSK demodulation, and satellite acquisition. The cellular baseband 238C may comprise suitable logic, circuitry and/or code that may be enabled to process cellular signals. For example, voice and data speed adapting and channel coding/decoding. The FM baseband 238D may comprise suitable logic, circuitry and/or code that may be enabled to process FM baseband signals and may comprise exemplary processing such as, for example, stereo decoder, spike detection and noise blanking.

The Bluetooth radio 240A may comprise suitable logic, circuitry and/or code that may be enabled to transmit and/or receive signals in the unlicensed 2.4 GHz spectrum. The GPS radio 240B may comprise suitable logic, circuitry and/or code that may be enabled to receive signals transmitted at, for example, a frequency of 1575.42 MHz from the GPS satellite 110. The cellular radio 204C may comprise suitable logic, circuitry and/or code that may be enabled to transmit and/or receive signals in a cellular spectrum, for example, a band from 890 to 915 MHz for a GSM system. The FM radio 240D may comprise suitable logic, circuitry and/or code that may be enabled to receive signals from the FM radio station 106 in a band from 88 to 108 MHz.

While FIG. 2 illustrates exemplary non-Bluetooth devices as on chip non-Bluetooth devices, the invention may not be limited in this regard. Accordingly, in various aspects of the invention, a downloadable driver on the Bluetooth enabled device may enable communication with off-chip non-Bluetooth devices.

In operation, in instances where the host 210 may receive non-Bluetooth data through, for example, the GPS radio 240B. The GPS radio 240B may down-convert received GPS satellite spread spectrum radio frequency signals to lower frequency signals. The lower frequency GPS satellite signals may be passed to the GPS baseband 238B and may be converted to GPS baseband packets. In an exemplary embodiment of the invention, a Data Ready to Read event with assigned GPS VSC may be created and passed to the host 210 via the transport layer 220 and the HCI host driver 218 when the GPS baseband packets may be ready to be transmitted to the host 210. The host packet mux/demux 216 may identify upcoming data type based on the VSC and route the packet to the host BT packet processing 214. The host BT packet processing 214 may decode the Data Ready to Read event payload and pass it to the GPS upper stack 212B.

The GPS upper stack 212B may generate a GPS read data command packet accordingly and pass it to the host BT packet processing 214. The GPS read data command packet may be converted to a GPS VSC read data command packet and inputted to the host packet mux/demux 216. The GPS VSC read data command packet may be multiplexed with other downstream HCI packets and moved to the host controller packet mux/demux 232 through the HCI host driver 218, the transport 220, and the HCI controller driver 232. The GPS VSC read data command packet may be identified based on the VSC at the host controller packet mux/demux 232 and pass to the host controller packet processing 236.

The host controller packet processing 234 may decode the GPS VSC read data command packet payload and then pack the GPS baseband packets with the VSC as GPS VSC read data command complete packets. The size of the GPS VSC read data command complete packet may be determined by, for example, the transport layer capability and/or QoS. The GPS VSC read data command complete packets may be multiplexed with other upstream HCI packets and passed to the host 210 through the host controller driver 232, the transport 220, and the host driver 218. The GPS VSC read data command complete packets may be identified by the VSC at the host packet mux/demux 216 and routed to the host BT packet processing 214. The payload of the GPS VSC read data command complete packets may be decoded at the host BT packet processing 214 and passed to the GPS upper stack 212B for further processing accordingly.

In operation, there may be instances when the host 210 may have non-Bluetooth data to send, for example, the GPS data from the GPS upper stack 212B, to the GPS baseband 238B. The GPS upper stack 212B may prepare upper stack GPS data and send it to the host BT processing 214. The host BT packet processing 214 may pack the received upper stack GPS data as, for example, GPS VSC write data command packets. The size of the GPS VSC write data command packet may be determined by, for example, the capability of the transport layer and/or QoS. The GPS VSC write data command packets may be multiplexed with to other downstream Bluetooth HCI packets and passed to the host controller 230 through the HCI host driver 218, the transport 220, and the HCI controller driver 232. The GPS VSC write data command packets may be de-multiplexed based on the VSC at the host controller mux/demux 234 and may be passed to the host controller BT packet processing 236. The host controller BT packet processing 236 may decode the payload of the GPS VSC write data command packets and pass it to the GPS baseband 238B accordingly. In instances where the GPS device may be an off-chip device, a downloadable driver may be enabled by the multi-standard device 200 to ensure that the decoded payload of the transmitted VSC Bluetooth HCI packets is correctly communicated to the off-chip GPS device.

Figure 3:
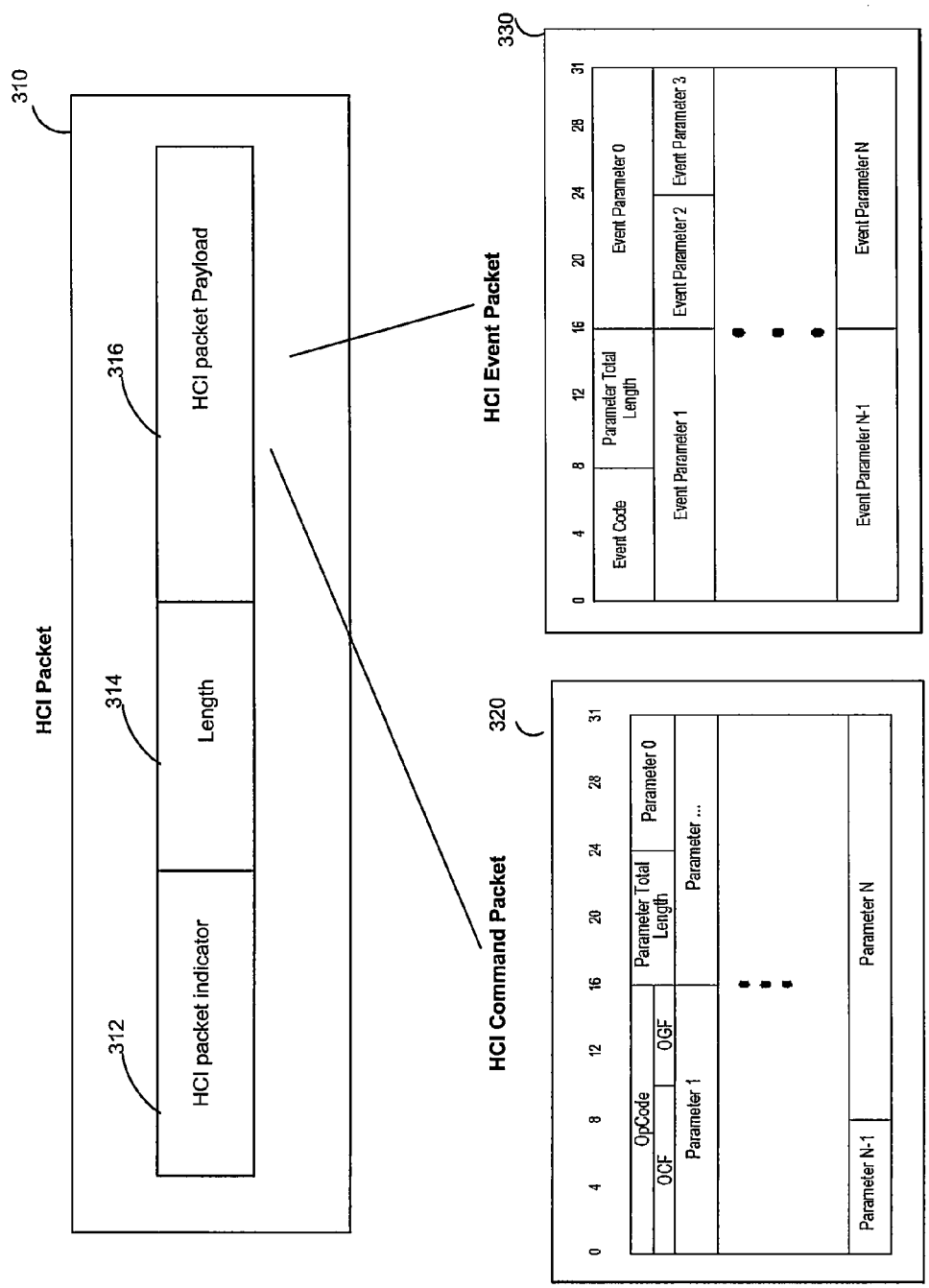
FIG. 3 is a diagram illustrating an exemplary Bluetooth HCI packet, in accordance with an embodiment of the invention.

FIG. 3 is a diagram illustrating an exemplary Bluetooth HCI packet, in accordance with an embodiment of the invention. Referring to FIG. 3, there is a HCI packet 310, a HCI command packet 320, and a HCI event packet 330.

The exemplary HCI packet 310 may comprise a HCI packet indicator field 312, a length field 314, and a HCI packet payload field 316. The HCI packet indicator field 312 may provide information on HCI packet type. Exemplary types of HCI packets may comprise HCI Command Packet, HCI Event Packet, HCI ACL Data Packet, and HCI SCO Data Packet. These HCI packets may not be differentiated over the HCI and may be sent through a common transport interface. The length filed 314 may indicate how many bytes the HCI packet should expect. The payload field 316 may store communication information received from/to the upper level protocols. In this regard, the payload may store Bluetooth communication information as well as non-Bluetooth communication information such as communication through GPS technology, FM technology, and cellular technology. The Bluetooth transport 220 may be shared between both Bluetooth and non-Bluetooth communications. In this regard, the non-Bluetooth communication information may be packed by using a VSC specifically assigned based on a data type. Bluetooth may recognize how to handle the VSC packets even though Bluetooth may not know how to handle the non-Bluetooth communication payload.

The HCI Command Packet 320 may be used to send commands to the host controller 230 from the host 210. Each HCI command may be assigned an Opcode used to uniquely identify different types of commands. The Opcode parameter may be divided into a plurality of fields comprising an OpCode Group Field (OGF) and OpCode Command Field (OCF). In this regard, a vendor specific code may be assigned to non-Bluetooth data such as the GPS data and FM data. Each HCI command may have a specific number of parameters associated with it. These parameters and the size of each of the parameters may be defined for each command. Each parameter may be an integer number of bytes in size.

The HCI event packet 330 may be used by the host controller 230 to notify the host 210 when events may occur. Each HCI event may be assigned an event code used to uniquely identify different types of events. In this regard, a vendor specific code may be assigned to non-Bluetooth data such as the GPS data. Each HCI event may have a specific number of parameters associated with it. Length of all of the parameters contained in this packet, measured in bytes.

While FIG. 3 illustrates exemplary HCI command and HCI event, other suitable HCI packets may be utilized without departing from the scope of the various embodiments of the invention.

Figure 4:
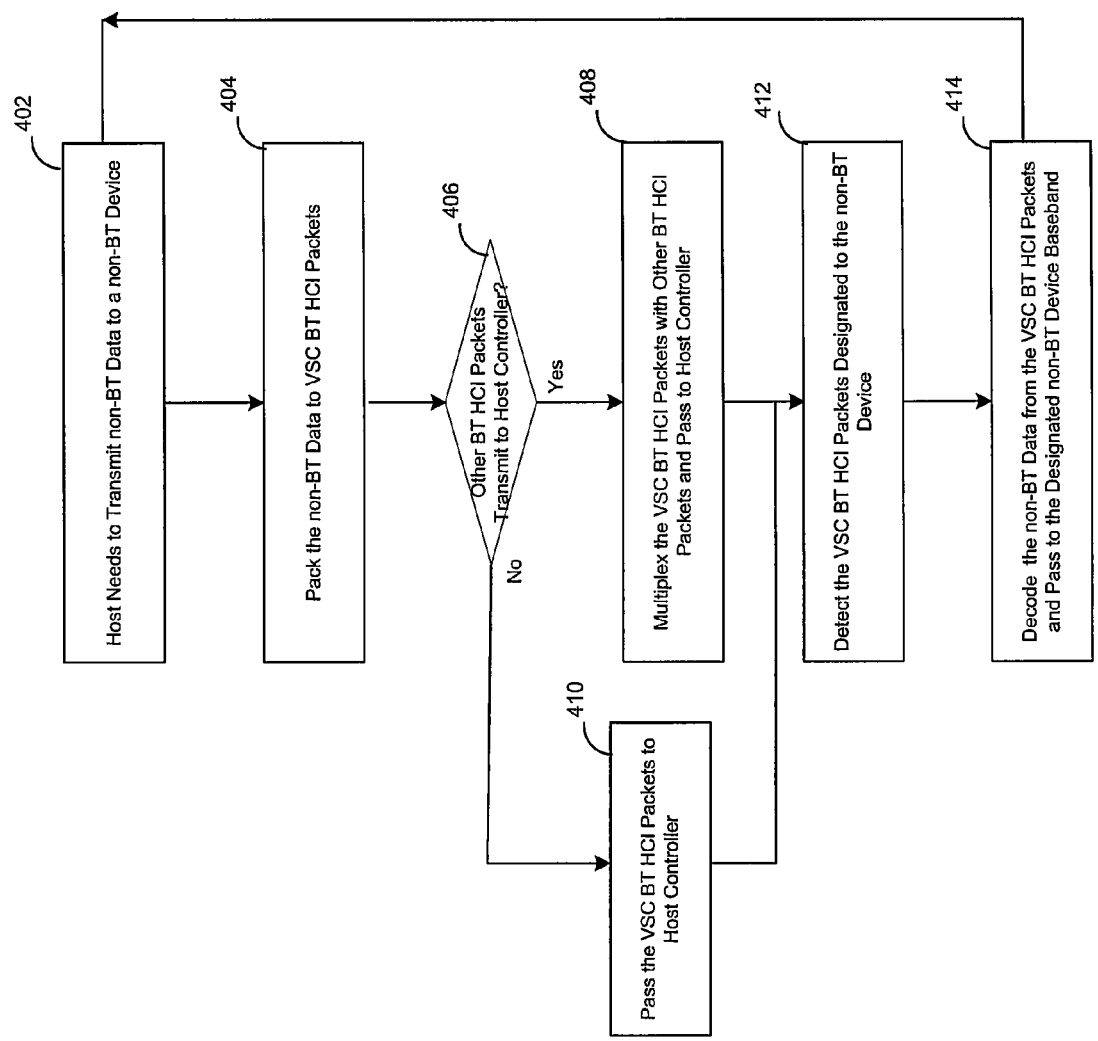
FIG. 4 is a flow chart that illustrates exemplary steps for transmitting non-Bluetooth data from host to a non-Bluetooth device by sharing Bluetooth transport, in accordance with an embodiment of the invention.

FIG. 4 is a flow chart that illustrates exemplary steps for transmitting non-Bluetooth data from host to a non-Bluetooth device by sharing Bluetooth transport, in accordance with an embodiment of the invention. Referring to FIG. 4, the exemplary steps begin in step 402, where due to a user intervention or some application logic, the host 210 may need to send non-Bluetooth data such as upper stack GPS data from the GPS upper stack 212B to corresponding non-Bluetooth device, for example, the GPS baseband 238B. In step 404, the upper stack GPS data may be packed as VSC Bluetooth HCI packets at the host BT packet processing 214. In this regard, a VSC may be included in the VSC Bluetooth packets and the upper stack GPS data may be inserted as payload of the VSC Bluetooth HCI packets. The size of the VSC Bluetooth HCI packets may be determined by the Bluetooth transport capability and/or QoS. In step 406, the host 210 may check whether other downstream Bluetooth HCI packets may be buffered for the host controller 230. In instances where other downstream Bluetooth HCI packets may be buffered or queued for transmission to the host controller 230, in step 408, the VSC Bluetooth HCI packets may be multiplexed with other downstream Bluetooth HCI packets and passed to the host controller 230 over the Bluetooth transport 220. In step 412, the resulting Bluetooth HCI packet stream may be demultiplexed at the host controller packet mux/demux 234. The transmitted VSC Bluetooth HCI packets designated to, for example, the GPS device, may be detected based on the VSC and may be routed to the host controller BT packet processing 236. In step 414, the payload of the transmitted VSC Bluetooth HCI packets may be decoded and may be passed to the GPS baseband 238B for further baseband processing. When the GPS device may be off-chip, a downloadable driver may be enabled by the Bluetooth host controller 230 to ensure the decoded payload of the transmitted VSC Bluetooth HCI packets is correctly communicated to the off-chip GPS device.

In instances where no other Bluetooth HCI packets may be buffered or queued for the host controller 230, then in step 410, the VSC Bluetooth HCI packets may be passed to the host controller 230 over the Bluetooth transport 220, go to step 412.

Figure 5:
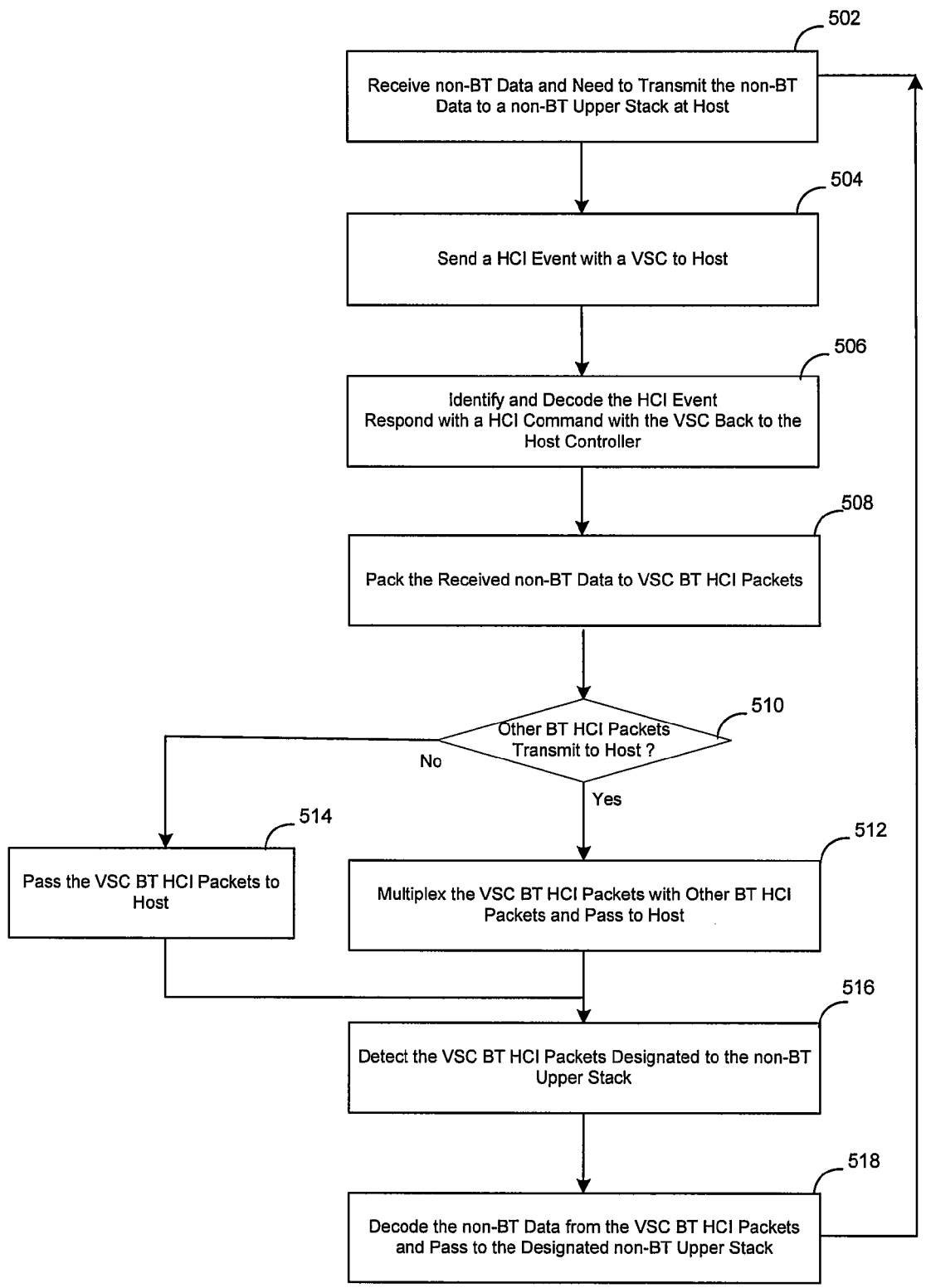
FIG. 5 is a flow chart that illustrates exemplary steps for transmitting non-Bluetooth data from a Non-Bluetooth device to host by sharing Bluetooth transport, in accordance with an embodiment of the invention.

FIG. 5 is a flow chart that illustrates exemplary steps for transmitting non-Bluetooth data from a non-Bluetooth device to host by sharing Bluetooth transport, in accordance with an embodiment of the invention. Referring to FIG. 5, the exemplary steps begin in step 502, where a non-Bluetooth device, for example, the GPS radio 240B, may receive GPS data and may need to transmit to the GPS upper stack 212B. When the GPS device may be off-chip, a downloadable driver may be enabled on the Bluetooth host controller 230 to ensure the received GPS data is correctly communicated to the Bluetooth host controller 230.

In step 504, a HCI event with a VSC specifying the GPS data type may be generated and send to the host 210 to indicate that the GPS data at the GPS baseband 238B may be ready to read by the GPS upper stack 212B. In step 506, the VSC HCI event packet may be identified at the host dex/mudex 216 and routed to the host packet processing 214. The payload of the VSC HCI event packet may be decoded at the host packet processing 214 and inform the GPS upper stack 212B to be ready to read the GPS data from the GPS radio 240B. The host 210 may send a HCI command with the VSC back to the GPS baseband 238B to indicate that the host 210 may be ready to accept GPS data from the GPS radio 240B. In step 508, the non-Bluetooth data, for example, the GPS baseband data may be packed as VSC Bluetooth HCI packets at the host controller BT packet processing 236. The VSC may be included in the VSC Bluetooth HCI packets and the GPS baseband data may be inserted as payload of the VSC Bluetooth HCI packets. In this regard, a downloadable driver on the multi-standard device 200 may ensure that the GPS baseband data may be correctly communicated to the host controller 230.

In step 510, the host controller 230 may check whether other Bluetooth HCI packets may be buffered or queued for transmission to the host 210. In instances where other Bluetooth HCI packets may wait for be transmitted to the host 210, in step 512, the VSC Bluetooth HCI packets may multiplexed with other Bluetooth HCI packets at the host controller packet Mux/Demux 234 and may be passed to the host 210 over the Bluetooth transport 220. In step 516, the resulting Bluetooth HCI packet stream may be demultiplexed at the host packet mux/demux 216. The transmitted VSC Bluetooth HCI packets designated to, for example, the GPS upper stack 212B, may be detected based on the VSC and be routed to the host BT packet processing 214. In step 518, the payload of the transmitted VSC Bluetooth HCI packets may be decoded and may be passed to the GPS upper stack 212B for further upper layer processing. In instances where no other Bluetooth HCI packets may be queued or buffered for communication to the host 210, then in step 514, the VSC Bluetooth HCI packets may be passed to the host 210 over the Bluetooth transport 220, go to step 516.

Aspects of a method and system for Bluetooth transport sharing to carry GPS or other types of data are provided. In accordance with various embodiments of the invention, a multi-standard Bluetooth enabled device such as the cell phone 102 may be enabled to operate via one or more integrated radios such as the GPS radio 240B, the cellular radio 240C and the FM radio 240D. The Bluetooth transport 220 layer may be shared to carry both Bluetooth data and non-Bluetooth data. In this regard, a vendor specific command may be assigned to each non-Bluetooth data type and the non-Bluetooth data may be converted to Bluetooth vendor specific packets at the host BT packet processing 214 or the host controller BT packet processing 236 by using the assigned vendor specific command. The Bluetooth vendor specific packets may be multiplexed with other Bluetooth HCI packets at the host packet Mux/Demux 216 or the host controller packet Mux/Demux 236 and pass the Bluetooth transport layer 220. The Bluetooth vendor specific packets may be de-multiplexed based on the assigned vendor specific command from other Bluetooth HCI packets at the host packet Mux/Demux 216 or the host controller packet Mux/Demux 236 and passed to the corresponding upper layer stack 212 or the corresponding baseband 238. In this regard, the non-Bluetooth device such as, for example, the GPS baseband 238B together the GPS radio 240B, may be an on-chip or an off-chip device. In this regard, the multi-standard Bluetooth enabled device 200 may enable a downloadable driver to provide instructions for correctly conveying the non-Bluetooth data to the off-chip non-Bluetooth device. The Bluetooth transport layer 220 may be UART, USB, SPI, and/or I2C. The Bluetooth transport layer 220 may be powered up and down based upon the need of both Bluetooth device 238A and/or non-Bluetooth devices such as 238B, 238C, and 238D. The non-Bluetooth data may comprise FM data or FM RDS data, Near Field Communication (NFC) data, wireless magnetic sensor data, IrDA data, accelerometer data, and/or cellular data. The cellular data may comprise, for example, GSM data, GPRS data, EDGE data, CDMA data, WCDMA data, HSDPA data, and/or UMTS data. The FM data may comprise RDS data. The Bluetooth transport layer 220 may be UART, USB, SPI, and/or $I^2C$.

Another embodiment of the invention may provide a machine-readable storage, having stored thereon, a computer program having at least one code section executable by a machine, thereby causing the machine to perform the steps as described herein for Bluetooth transport sharing to carry GPS or other types of data.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, the method comprising:
   in a multi-standard communication device that handles Bluetooth protocol and one or more non-Bluetooth wireless protocols, sharing a Bluetooth transport layer that handles corresponding Bluetooth data so that corresponding data for said one or more non-Bluetooth wireless protocols utilize said Bluetooth transport layer for communication with corresponding different upper non-Bluetooth protocol stacks of said one or more non-Bluetooth wireless protocols on a host device; and
   assigning a particular vendor specific command to each type of non-Bluetooth data comprising said corresponding data for said one or more non-Bluetooth wireless protocols.

2. The method according to claim 1, comprising converting said non-Bluetooth data to Bluetooth vendor specific command packets with said particular vendor specific command.

3. The method according to claim 2, comprising multiplexing said Bluetooth vendor specific command packets with other Bluetooth packets.

4. The method according to claim 2, comprising de-multiplexing said Bluetooth vendor specific command packets with other Bluetooth packets based on said particular vendor specific command.

5. The method according to claim 1, wherein said corresponding data for said one or more non-Bluetooth wireless protocols comprises at least one of GPS data, FM data, Near Field Communication (NFC) data, wireless magnetic sensor data, IrDA data, accelerometer data, or cellular data.

6. The method according to claim 5, wherein said FM data comprises RDS data.

7. The method according to claim 5, wherein said cellular data comprises at least one of GSM data, GPRS data, EDGE data, CDMA data, WCDMA data, HSDPA data, or UMTS data.

8. The method according to claim 1, wherein said one or more non-Bluetooth wireless protocols associates with on-chip devices and off-chip devices.

9. The method according to claim 8, wherein a downloadable driver may be enabled on said multi-standard communication device to handle communication between said multi-standard communication device and said off-chip devices.

10. The method according to claim 1, wherein said Bluetooth transport layer is powered up to respond to non-Bluetooth data communication.

11. The method according to claim 1, wherein said Bluetooth transport layer comprises at least one of UART, USB, SPI, or I²C.

12. A system, the system comprising:
   one or more circuits in a multi-standard communication device, wherein said one or more circuits:
      enables said multi-standard communication device to handle Bluetooth protocol and one or more non-Bluetooth wireless protocols;
      enables sharing of a Bluetooth transport layer that handles corresponding Bluetooth data so that corresponding data for said one or more non-Bluetooth wireless protocols utilize said Bluetooth transport layer for communication with corresponding different upper non-Bluetooth protocol stacks of said one or more non-Bluetooth wireless protocols on a host device; and
      enables assignment of a particular vendor specific command to each type of non-Bluetooth data comprising said corresponding data for said one or more non-Bluetooth wireless protocols.

13. The system according to claim 12, wherein said one or more circuits enables conversion of said non-Bluetooth data to Bluetooth vendor specific command packets with said particular vendor specific command.

14. The system according to claim 13, wherein said one or more circuits enables multiplexing of said Bluetooth vendor specific command packets with other Bluetooth packets.

15. The system according to claim 13, wherein said one or more circuits enables de-multiplexing of said Bluetooth vendor specific command packets with other Bluetooth packets based on said particular vendor specific command.

16. The system according to claim 12, wherein said corresponding data for said one or more non-Bluetooth wireless protocols comprises at least one of GSM data, FM data, Near Filed Communication (NFC) data, wireless magnetic sensor data IrDA data, accelerometer data, or cellular data.

17. The system according to claim 16, wherein said FM data comprises RDS data.

18. The system according to claim 16, wherein said cellular data comprises at least one of GSM data, GPRS data, EDGE data, CDMA data, WCDMA data, HSDPA data, or UMTS data.

19. The system according to claim 13, wherein said one or more non-Bluetooth wireless protocols associates with on-chip devices and off-chip devices.

20. The system according to claim 19, wherein said one or more circuits enables a downloadable driver on said multi-standard communication device to handle communication between said multi-standard communication device and said off-chip devices.

21. The system according to claim 12, wherein said Bluetooth transport layer is powered up to respond to non-Bluetooth data communication.

22. The system according to claim 12, wherein said Bluetooth transport layer comprises at least one of UART, USB, SPI, or I²C.

23. A non-transitory machine-readable storage having stored thereon, a computer program having at least one code section, the at least one code section being executable by a machine to cause the machine to:
   in a multi-standard communication device that handles Bluetooth protocol and one or more non-Bluetooth wireless protocols, share a Bluetooth transport layer that handles corresponding Bluetooth data so that corresponding data for said one or more non-Bluetooth wireless protocols utilize said Bluetooth transport layer for communication with corresponding different upper non-Bluetooth protocol stacks of said one or more non-Bluetooth wireless protocols on a host device;
   wherein said at least one code section comprises code that assigns a particular vendor specific command to each type of non-Bluetooth data comprising said corresponding data for said one or more non-Bluetooth wireless protocols.

24. The non-transitory machine-readable storage according to claim 23, wherein said at least one code section comprises code that converts said non-Bluetooth data to Bluetooth vendor specific command packets with said particular vendor specific command.

25. The non-transitory machine-readable storage according to claim 24, wherein said at least one code section comprises code that multiplexes said Bluetooth vendor specific command packets with other Bluetooth packets.

26. The non-transitory machine-readable storage according to claim 24, wherein said at least one code section comprises code that de-multiplexes said Bluetooth vendor specific command packets with other Bluetooth packets based on said particular vendor specific command.

27. The non-transitory machine-readable storage according to claim 23, wherein said corresponding data for said one or more non-Bluetooth wireless protocols comprises at least one of GPS data, FM data, Near Field Communication (NFC) data, wireless magnetic sensor data, IrDA data, accelerometer data, or cellular data.

28. The non-transitory machine-readable storage according to claim 27, wherein said FM data comprises RDS data.

29. The non-transitory machine-readable storage according to claim 27, wherein said cellular data comprises at least one of GSM data, GPRS data, EDGE data, CDMA data, WCDMA data, HSDPA data, or UMTS data.

30. The non-transitory machine-readable storage according to claim 27, wherein said one or more non-Bluetooth wireless protocols associates with on-chip devices and off-chip devices.

31. The non-transitory machine-readable storage according to claim 30, wherein a downloadable driver may be enabled on said multi-standard communication device to handle communication between said multi-standard communication device and said off-chip devices.

32. The non-transitory machine-readable storage according to claim 23, wherein said Bluetooth transport layer is powered up to respond to non-Bluetooth data communication.

33. The non-transitory machine-readable storage according to claim 23, wherein said Bluetooth transport layer comprises at least one of UART, USB, SPI, or $I^2C$.

* * * * *